US008268956B2

(12) United States Patent
Bühler et al.

(10) Patent No.: US 8,268,956 B2
(45) Date of Patent: Sep. 18, 2012

(54) TRANSPARENT MOLD MADE OF A POLYAMIDE MOLDING MATERIAL

(75) Inventors: Friedrich Severin Bühler, Thusis (CH); Christian Rytka, Bonaduz (CH)

(73) Assignee: Ems-Chemie AG, Domat/Ems (CH)

( * ) Notice: Subject to any disclaimer, the term of this patent is extended or adjusted under 35 U.S.C. 154(b) by 901 days.

(21) Appl. No.: 11/950,964

(22) Filed: Dec. 5, 2007

(65) Prior Publication Data

US 2008/0135720 A1 Jun. 12, 2008

Related U.S. Application Data

(60) Provisional application No. 60/869,145, filed on Dec. 8, 2006.

(51) Int. Cl.
*C08G 69/26* (2006.01)

(52) U.S. Cl. ........ 528/310; 528/335; 528/336; 528/337; 528/338; 528/339; 528/340

(58) Field of Classification Search .................. 528/310, 528/335, 336, 338, 340

See application file for complete search history.

(56) References Cited

U.S. PATENT DOCUMENTS

| | | | |
|---|---|---|---|
| 2,516,585 A | 7/1950 | Pease | |
| 4,036,811 A | 7/1977 | Noetzel et al. | |
| 4,076,664 A * | 2/1978 | Pagilagan | 528/339.3 |
| 4,212,777 A | 7/1980 | Goletto | |
| 4,345,066 A * | 8/1982 | Ruter | 528/324 |
| 4,603,166 A | 7/1986 | Poppe et al. | |
| 4,617,342 A * | 10/1986 | Poppe et al. | 524/606 |
| 4,680,379 A | 7/1987 | Coquard et al. | |
| 4,731,421 A | 3/1988 | Hoppe et al. | |
| 4,826,951 A | 5/1989 | Coquard et al. | |
| 4,831,108 A | 5/1989 | Richardson et al. | |
| 4,847,356 A | 7/1989 | Hoppe et al. | |
| 5,071,924 A | 12/1991 | Koch et al. | |
| 5,081,222 A | 1/1992 | Reimann et al. | |
| 5,098,940 A | 3/1992 | Brooks | |
| 5,177,177 A | 1/1993 | Thullen et al. | |
| 5,177,178 A | 1/1993 | Thullen et al. | |
| 5,191,060 A | 3/1993 | Akkapeddi et al. | |
| RE34,447 E | 11/1993 | Poppe et al. | |
| 5,278,231 A | 1/1994 | Chundury | |
| 5,302,691 A | 4/1994 | Soelch | |
| 5,310,860 A | 5/1994 | Maj et al. | |
| 5,422,418 A | 6/1995 | Maj et al. | |
| 5,480,945 A * | 1/1996 | Vicik | 525/432 |
| 5,560,398 A | 10/1996 | Pfleger | |
| 5,674,973 A | 10/1997 | Pipper et al. | |
| 5,684,120 A * | 11/1997 | Torre | 528/346 |
| 5,688,901 A * | 11/1997 | Fisch et al. | 528/310 |
| 5,708,125 A | 1/1998 | Liedloff et al. | |
| 5,773,556 A | 6/1998 | Kleiner et al. | |
| 5,786,086 A | 7/1998 | Frihart et al. | |
| 5,807,972 A | 9/1998 | Liedloff et al. | |
| 5,917,004 A | 6/1999 | Liedloff et al. | |
| 6,204,355 B1 | 3/2001 | Dalla Torre et al. | |
| 6,255,371 B1 | 7/2001 | Schlosser et al. | |
| 6,270,560 B1 | 8/2001 | Kleiner et al. | |
| 6,291,633 B1 | 9/2001 | Nakamura | |
| 6,319,986 B1 | 11/2001 | Amimoto et al. | |
| 6,365,071 B1 | 4/2002 | Jenewein et al. | |
| 6,547,992 B1 | 4/2003 | Schlosser et al. | |
| 6,943,231 B2 * | 9/2005 | Buhler | 528/310 |
| 7,014,315 B2 | 3/2006 | Iori et al. | |
| 7,249,844 B2 | 7/2007 | Sakai | |
| 7,723,411 B2 | 5/2010 | Schneider | |
| 8,022,170 B2 | 9/2011 | Hoffman et al. | |
| 2001/0007888 A1 | 7/2001 | Asano | |
| 2003/0018107 A1 | 1/2003 | Heinen et al. | |
| 2003/0126788 A1 | 7/2003 | Uang et al. | |
| 2003/0235666 A1 | 12/2003 | Bühler | |
| 2004/0158028 A1 | 8/2004 | Bühler | |
| 2005/0049339 A1 | 3/2005 | Knop et al. | |
| 2005/0101708 A1 | 5/2005 | Knop et al. | |
| 2006/0138391 A1 | 6/2006 | Drewes et al. | |
| 2006/0235190 A1 | 10/2006 | Hoffman et al. | |
| 2006/0264542 A1 | 11/2006 | Schneider | |
| 2007/0072970 A1 | 3/2007 | Schneider | |
| 2007/0222941 A1 | 9/2007 | Sakai | |
| 2007/0270544 A1 | 11/2007 | Bühler et al. | |
| 2010/0022742 A1 | 1/2010 | Bühler et al. | |

(Continued)

FOREIGN PATENT DOCUMENTS

CA 861620 1/1971

(Continued)

OTHER PUBLICATIONS

Extended European Search Report dated Jun. 25, 2010 for EP 07011718.7.
"BIAX, ein neuer Prüfkörper" (BIAX, a new inspection piece), published in Noss'Ovra staff magazine, Dec. 2006, No. 12, 29th year, EMS-CHEMIE AG (4 pgs.).
Cramer et al., "Some Isomorphous Copolyamides," *Journal of Polymer Science*, vol. 21, pp. 237-250 (1956).
Dolden, "Structure-property relationships in amorphous polyamides," *Polymer*, vol. 17, pp. 875-892 (1976).
Edgar et al., "The p-Phenylene Linkage in Linear High Polymers: Some Structure-Property Relationships," *Journal of Polymer Science*, vol. 8, No. 1, pp. 1-22 (1952).
Henkel Corporation, "Empol Dimer and Polybasic Acids: Technical Bulletin 114C," (1997).
Laura et al., "Effect of rubber particle size and rubber type on the mechanical properties of glass fiber reinforced, rubber-toughened nylon 6," *Polymer*, vol. 44, No. 11, pp. 3347-3361 (2003).

(Continued)

*Primary Examiner* — Gregory Listvoyb
(74) *Attorney, Agent, or Firm* — Leydig, Voit & Mayer, Ltd.

(57) ABSTRACT

The invention is directed to a transparent mold made of a polyamide molding material containing at least one polyamide formed from at least one diamine selected from the group of hexamethylene diamine (HMDA), bis-(4-amino-3-methylcyclohexyl)methane (MACM) and/or bis-(4-aminocyclohexyl)methane (PACM) as well as from at least one dicarboxylic acid selected from the group of isophthalic acid (IPS), terephthalic acid (TPS) and/or dodecanedioic acid (DDS) or from the aforementioned diamines and dicarboxylic acids in combination with lactams and/or α-/ω-amino acids.

16 Claims, No Drawings

U.S. PATENT DOCUMENTS

| | | |
|---|---|---|
| 2010/0227122 A1 | 9/2010 | Kumazawa et al. |
| 2010/0279111 A1 | 11/2010 | Philipp et al. |
| 2011/0220667 A1 | 9/2011 | Pfleghar et al. |

FOREIGN PATENT DOCUMENTS

| | | |
|---|---|---|
| CA | 2019904 | 1/1991 |
| CH | 280367 | 1/1952 |
| DE | 24 47 727 A1 | 4/1976 |
| DE | 26 42 244 A1 | 3/1977 |
| DE | 36 00 015 A1 | 7/1986 |
| DE | 43 29 676 A1 | 3/1994 |
| DE | 195 37 614 A1 | 4/1997 |
| DE | 199 20 276 A1 | 11/2000 |
| DE | 199 33 901 A1 | 2/2001 |
| DE | 102 24 947 A1 | 12/2003 |
| DE | 102 59048 A1 | 7/2004 |
| DE | 103 16 873 A1 | 11/2004 |
| DE | 103 46 326 A1 | 5/2005 |
| DE | 694 28 832 T3 | 2/2007 |
| EP | 0 196 981 A1 | 10/1986 |
| EP | 0 246 620 A2 | 11/1987 |
| EP | 0 288 269 A1 | 10/1988 |
| EP | 0 299 444 A2 | 1/1989 |
| EP | 0 360 611 A2 | 3/1990 |
| EP | 0 376 616 B1 | 7/1990 |
| EP | 0 410 301 A1 | 1/1991 |
| EP | 0 449 466 A1 | 10/1991 |
| EP | 0 469 435 A1 | 2/1992 |
| EP | 0 508 054 A2 | 10/1992 |
| EP | 0 550 314 A1 | 7/1993 |
| EP | 0 550 315 A1 | 7/1993 |
| EP | 0 659 534 A2 | 6/1995 |
| EP | 0 693 515 A1 | 1/1996 |
| EP | 0 699 708 A2 | 3/1996 |
| EP | 0 792 912 A2 | 9/1997 |
| EP | 0 818 491 A2 | 1/1998 |
| EP | 0 837 087 A1 | 4/1998 |
| EP | 0 771 846 B1 | 1/2002 |
| EP | 1 369 447 A1 | 12/2003 |
| EP | 1 475 403 A1 | 11/2004 |
| EP | 1 548 059 A1 | 6/2005 |
| EP | 1 630 590 A1 | 3/2006 |
| EP | 1 712 581 A1 | 10/2006 |
| EP | 1 752 492 A1 | 2/2007 |
| EP | 1 845 123 A1 | 10/2007 |
| EP | 1 942 296 A1 | 7/2008 |
| EP | 1 972 659 A1 | 9/2008 |
| EP | 2 060 607 A1 | 5/2009 |
| EP | 2 082 861 A1 | 7/2009 |
| EP | 1 474 459 B1 | 11/2009 |
| EP | 2 365 033 A1 | 9/2011 |
| GB | 766927 | 1/1957 |
| GB | 1548431 | 7/1979 |
| JP | 54-071191 A | 6/1979 |
| JP | 61-200125 A | 9/1986 |
| JP | 63-023927 A | 2/1988 |
| JP | 02-302440 | * 12/1990 |
| JP | 03-050264 | * 3/1991 |
| JP | 05-125184 A | 5/1993 |
| JP | 06-511281 T | 12/1994 |
| JP | 08-239469 A | 8/1996 |
| JP | 08-259808 A | 10/1996 |
| JP | 09-078351 A | 3/1997 |
| JP | 10-168183 A | 6/1998 |
| JP | 10-219026 | 8/1998 |
| JP | 2001-261973 | 9/2001 |
| JP | 2004-083858 | 3/2004 |
| JP | 2006-045390 | 2/2006 |
| WO | WO 90/02017 A1 | 3/1990 |
| WO | WO 92/01389 A1 | 2/1992 |
| WO | WO 92/10525 A1 | 6/1992 |
| WO | WO 94/29367 A1 | 12/1994 |
| WO | WO 95/01389 A1 | 1/1995 |
| WO | WO 97/39053 A1 | 10/1997 |
| WO | WO 99/02606 A1 | 1/1999 |
| WO | WO 01/21698 A1 | 3/2001 |
| WO | WO 02/28953 A1 | 4/2002 |
| WO | WO 02/090421 A2 | 11/2002 |
| WO | WO 2004/055084 A2 | 7/2004 |
| WO | WO 2004/078848 A1 | 9/2004 |
| WO | WO 2004/090036 A1 | 10/2004 |
| WO | WO 2007/080754 A1 | 7/2007 |
| WO | WO 2007/087896 A1 | 8/2007 |
| WO | WO 2009/062692 A2 | 5/2009 |

OTHER PUBLICATIONS

Levine et al., "Isomorphous Replacement in a Copolyamide System," *Journal of Polymer Science*, Issue XLIX, pp. 241-246 (1961).

Unichema International, "Pripol C36-Dimer Acid."

Yu et al., "Isomorphous Replacement in a Copolyamide System: Homologs of Adipic and Terephthalic Acids," *Am. Chem. Soc.*, Issue 81, pp. 5361-5365 (1959).

Japanese Patent Office, Office Action in Japanese Patent Application No. 2007-316560 (Nov. 28, 2011).

* cited by examiner

TRANSPARENT MOLD MADE OF A POLYAMIDE MOLDING MATERIAL

CROSS-REFERENCE TO RELATED APPLICATIONS

This patent application claims the benefit of U.S. Provisional Patent Application No. 60/869,145, filed Dec. 8, 2006, which is hereby incorporated by reference.

BACKGROUND OF THE INVENTION

The present invention relates to transparent molds, which are made of selected polyamide molding materials, the physical properties of which, in particular the transparency and the dynamic resistance, are superior to polycarbonate. The molds of the invention achieve in part multiple times more bending cycles at higher stress than polycarbonate without damaging the molded part.

Transparent molds made of polyamide or polycarbonate are known from the state of the art. For special applications, such as e.g. glass for frameless glasses, polycarbonate is normally used, wherein the glass has e.g. screws for connection with the earpiece and the nose bridge.

However, mechanical stress fractures, which can lead to breaks in the lens in the case of a dynamic bending load, develop at these connections in particular in the case of polycarbonate.

For the production of frameless glasses, numerous constructions are described in literature for the fastening of the earpieces and the nose bridge to the lens. In all cases, this is performed by means of e.g. bore holes, tapped holes, blind holes, bushings or grooves in the lens and fixation with e.g. screws, pins, bolts, clamping devices or nylon threads.

EP 1 630 590 describes a fastening of glass lenses and a method for repairing lenses and glasses. It can also be applied to plastic lenses, wherein the lenses can e.g. be made of polycarbonate, acrylic resin, urethane resin and polyamide. More exact information on the types of polyamide that can be used was not provided. Moreover, properties, which the polyamide must fulfill in order to be suitable as a lens for frameless glasses, are not named. An example of frameless glasses is shown in a unfamiliar drawing.

Such frameless glass constructions with fastening elements such as earpieces, bridge or nose support fixed on the lens place very high demands on the dynamic capacity of the transparent material. As know from U.S. Pat. No. 7,014,315, these requirements cannot be fulfilled in a satisfactory manner by polycarbonate, PMMA, CR39 (duroplast based on diethylene glycol (bis)allyl carbonate) and glass.

The object of the present invention is thus to develop transparent molds made of polyamide molding materials, which have a low tendency to form mechanical stress fractures in the case of a dynamic load.

This object is solved with the transparent mold with the characteristics of claim 1. The dependent claims represent advantageous embodiments. Applications described herein.

In accordance with the invention, a transparent mold is suggested, which is formed from a polyamide molding material, which has at least one polyamide and/or blends of such with a light transmission (transparence) of at least 75% at a layer thickness of 2 mm, measured as per ASTM D 1003 as well as an alternating bend resistance with fixation of at least 60,000 measurement cycles, measured as per ISO 178 with a special test piece. The at least one polyamide is formed from at least one diamine selected from the group of hexamethylene diamine (HMDA), bis-(4-amino-3-methylcyclohexyl) methane (MACM) and/or bis-(4-amino-cyclohexyl)methane (PACM) as well as from at least one dicarboxylic acid selected from the group of isophthalic acid (IPS), terephthalic acid (TPS) and/or dodecanedioic acid (DDS) or from the aforementioned diamines and dicarboxylic acids in combination with lactams and/or α-/ω-amino acids.

Surprisingly, a combination of monomers was found that allows the production of the polyamide molding materials, from which transparent molds can be formed, which fulfill the set objective. It was particularly surprising that the molds, e.g. when used as a lens, reach at least 60,000 bend cycles despite weakening through damage to the material structure of the lens by e.g. a bore hole, tapped hole, blind hole, bushing, groove, sawed, milled or ground edges.

The polyamide molding materials contained in the transparent molds tolerate constructive damage to the material structure, which was only unsatisfactorily possible with transparent substances up to now. The excellent chemical resistance known from polyamide is simultaneously retained.

The transparent molds according to the invention also have good heat resistance, rigidity and hardness.

The molds show a high dynamic load capacity and very high light transmission and are particularly suitable for producing correcting and non-correcting lenses, which are preferably used in frameless glasses.

In an advantageous variant, the at least one polyamide and/or blends of polyamides is formed from approx. 100 mol-% DDS as dicarboxylic acid and relating to 100 mol-% diamine from
 a) 20 to 100 mol-% MACM and
 b) 80 to 0 mol-% PACM and/or
 c) 80 to 0 mol-% HMDA.

In particular, the polyamide molding material is a polyamide made of MACM and DDS.

As an alternative, it is advantageous if the at least one polyamide and/or polyamide blends is formed from approx. 100 mol-% HMDA as diamine and relating to 100 mol-% dicarboxylic acid from
 a) 60 to 100 mol-% IPS and
 b) 40 to 0 mol-% TPS and/or
 c) 40 to 0 mol-% DDS.

Another advantageous variant provides that the at least one polyamide and/or polyamide blends is formed from approx. 100 mol-% DDS as dicarboxylic acid and relating to 100 mol-% diamine from
 a) 65 to 85 mol-%, preferably 67 to 80 mol-%, even more preferably approx. 71 mol-% PACM and
 b) 15 to 35 mol-%, preferably 20 to 33 mol-%, even more preferably approx. 29 mol-% MACM.

It is also beneficial if the at least one polyamide and/or polyamide blends formed from MACM, PACM and/or HMDA as well as IPS and/or TPS as well as lactams and/or α-/ω-amino acids, if necessary. Furthermore, it is also preferred if the at least one polyamide and/or polyamide blends are formed relating to 100 mol-% diamine from 15 to 60 mol-%, preferably 15 to 55 mol-%, even more preferably 25 to 50 mol-%, most preferably approx. 29 mol-% MACM and 40 to 85 mol-%, preferably 45 to 85 mol-%, even more preferably 50 to 75 mol-%, most preferably approx. 71 mol-% HMDA and 0 to 20 mol-%, preferably 0 to 15 mol-%, even more preferably 0 to 10 mol-% PACM as well as relating to 100 mol-% of the dicarboxylic acids from 40 to 60 mol-%, preferably 45 to 55 mol-%, even more preferably approx. 50 mol-% IPS and 40 to 60 mol-%, preferably 45 to 55 mol-%, even more preferably approx. 50 mol-% TPS.

Another advantageous embodiment provides that the at least one polyamide and/or polyamide blends thereof is formed relating to 100 mol-% diamine from approx. 39 mol-% MACM and approx. 52 mol-% HMDA and approx. 9 mol-% PACM as well as relating to 100 mol-% of the dicarboxylic acids from approx. 50 mol-% IPS and approx. 50 mol-% TPS.

In particular, these embodiments provide that up to 10 wt.-%, preferably 0.5 to 10 wt.-%, even more preferably 0.5 to 8 wt.-%, most preferably 0.5 to 6 wt.-% with respect to the total weight of the polyamide molding material is formed from a lactam and/or an α-/ω-amino acid.

In a special embodiment, approx. 4.6 wt.-% with respect to the total weight of the polyamide molding material is formed from a lactam and/or an α-/ω-amino acid.

In another special embodiment, approx. 3 wt.-% with respect to the total weight of the polyamide molding material is formed from a lactam and/or an α-/ω-amino acid.

Advantageously, the lactam and/or the α-/ω- amino acid is LC 11, LC 12, α-/ω- amino undecane acid and/or α-/ω- amino dodecane acid.

Embodiments, in which the at least one polyamide and/or polyamide blends have equal portions of IPS and TPS, are particularly preferred.

Moreover, the invention includes an advantageous alternative embodiment, in which the at least one polyamide and/or polyamide blends is formed from HMDA as well as IPS and/or TPS. It is thereby preferred if the at least one polyamide and/or polyamide blends are made of approx. 100 mol-% HMDA as diamine and relating to 100 mol-% dicarboxylic acid from
  a) 60 to 75 mol-%, preferably 62 to 70 mol-%, even more preferably approx. 66.7 mol-% IPS and
  b) 25 to 40 mol-%, preferably 30 to 38 mol-%, even more preferably approx. 33.3 mol-TPS.

In the case of the previously named molds, the dicarboxylic acids can be replaced up to a maximum of half of their molar content with naphthalene dicarboxylic acid, preferably with 2,6 naphthalene dicarboxylic acid.

In the case of the aforementioned formulations, the content of dicarboxylic acid and/or the content of diamines can also be slightly larger or smaller than 100 mol-%. Slightly should be understood to mean a deviation of +/−5 mol-%.

The molds according to the invention are characterized by excellent optical and mechanical properties. The mold preferably has light transmission of at least 88%, preferably at least 90%, even more preferably at least 91%, most preferably at least 92% with a layer thickness of 2 mm, measured based on ASTM 1003. Furthermore, the preferred alternating bend resistance with fixation is at least 75,000 measurement cycles, even more preferably at least 100,000 measurement cycles, most preferably at least 140,000 measurement cycles measured as per ISO 178 with a special test piece (as described below in the examples).

In particular, the molds according to the invention are characterized by a refractive index of 1.490-1.75, preferably 1.550-1.75, even more preferably 1.570-1.75. Another advantageous characteristic of the mold is an Abbe number of at least 25, preferably at least 27, even more preferably at least 28. The mold can also be colored. The mold can also have an optically active coating and/or a protective coating.

Furthermore, the mold can contain the additives known to the person skilled in the art for setting desired properties. In particular, the additives are thereby selected from the group consisting of condensation catalysts, chain regulators, defoaming agents, stabilizers, lubricants, dyes, photochrome additives, antistatics, demolding agents, optical brighteners, natural phyllo silicates, synthetic phyllo silicates or mixtures of the named additives.

In particular, the transparent mold according to the invention is an optical mold. An optical mold is a mold that has an interaction, e.g. absorbing, breaking, dispersing, reflecting interaction, with electromagnetic radiation with a wavelength in the range of 180 nm-1200 nm. Optical molds are also molds that are used in e.g. optical instruments or optical systems.

Transparent molds with a high rigidity, high chemical resistance, high dynamic load capacity and a high stress fracture resistance and higher heat resistance can also be made available with the aforementioned molds.

These properties simultaneously fulfill the high requirements of filter cups in domestic or commercial drinking water systems or compressed air systems, in which a lot of pressure-swell cycles with a high bursting strength must be managed as a result of abrupt pressure changes.

The molds according to the invention are also suitable for applications with high dynamic load capacity and high chemical resistance, in particular for corrective lenses, non-corrective lenses, lenses for frameless glasses, frameless glasses, glasses frames, sunglasses, corrective glasses, safety glasses, ski glasses, motorcycle glasses, protective glasses, visors, helmet visors, coverings, viewing glasses, protective shields, protector caps, camera lenses, magnifying glasses, prisms, automotive coverings, mirrors, flow meters, filter cups, diving computers, watch housings, mobile phone housings and displays, monitor coatings, polarization coatings, containers, fat containers, packaging, automotive windshields, light conductors, light conductor parts, lamp shades, decorative objects and other transparent parts that require these properties.

The molds according to the invention are also suitable for applications with high dynamic load capacity and high chemical resistance and high hardness, in particular for rodent-resistant tubes, lines, casing for electrical cables, film hinges, protective films, cable binders, connectors, optical light conductors.

The polyamide molding materials for the molds according to the invention are also suitable for the production of molds in which the weakening of the material structure comes from e.g. joint lines or welded seams.

1.) GENERAL MANUFACTURING SPECIFICATIONS

The invention is described in greater detail below based on examples and test results without restricting the invention to the named special characteristics.

The production of the polyamides takes place in a generally known manner in known stirable pressure autoclaves with a receiver vessel and a reaction vessel:

Deionized water is placed in the receiver vessel and the monomers and additives are added. It is then inertized multiple times with nitrogen. While being stirred, it is heated to 180 to 230° C. under the pressure that is created, in order to obtain a homogenous solution. This solution is pumped through a sieve into the reaction vessel and is then heated to the desired reaction temperature of 270 to 310° C. at a maximum pressure of 30 bar. In the pressure phase, the preparation is held at the reaction temperature for 2 to 4 hours. In the subsequent expansion phase, the pressure is reduced to atmospheric pressure within 1 to 2 hours, during which time the temperature can drop slightly.

In the following degasification phase, the preparation is held at a temperature of 270 to 340° C. under atmospheric pressure for 0.5 to 1 hour.

The polymer melt is distributed in strand form, cooled in a water bath at 15 to 80° C. and granulated. The granulate is dried for 12 hours at 80 to 120° C. under nitrogen to a water content of under 0.1 wt.-%.

The polyamide has a relative viscosity (measured at 20° C. in 0.5 wt.-% solution in m-cresol) of 1.43-2.15, preferably 1.50-2.15, even more preferably 1.55-2.15.

The setting of the relative viscosity and thus the molar mass can take place in a known manner, e.g. via monofunctional diamines or dicarboxylic acids, or difunctional diamines or dicarboxylic acids as chain regulators.

The glass transition temperature of the polyamide (measured by means of DSC at a heating rate of 20° C./min in accordance with ISO standard 11357-1/-2) is 120° C.-180° C., preferably 140° C.-175° C., even more preferably 150° C.-174° C.

The tension fatigue module of the polyamide (measured in accordance with ISO 527 on the ISO tension rod) is 1500 to 3600 MPa, preferably 2000 to 3500 MPa, even more preferably 2500 to 3400 MPa.

The dried granulate can be processed into transparent shaped articles in an injection molding machine at cylinder temperatures between 260 and 350° C. and tool temperatures between 60 and 120° C.

As blend components, one or more polymers can be selected from the group containing PA 6, PA 66, PA 69, PA 610, PA 612, PA 614, PA 66/6, PA 6/12, PA 11, PA 12, PA 912, PA 1212, polyester amides, polyether amides, preferably from the group containing PA 6, PA 612, PA 614, PA 6/12, PA 11, PA 12, polyester amides, polyether amides.

2.) Measurement of the Dynamic Load Capacity By Means of a Bend Test With Fixation in the Case of Multiple Loads The measurement is performed on 100×80×2 mm plates, wherein a 25-mm-wide strip is sawn off on the side opposite the film gate and is provided in the middle with a 3-mm bore hole. The sawn edge is deburred and smoothed by grinding, e.g. with a belt grinder and a zirconium-corundum polyester belt with granulation 100. Washers (diameter 9 mm, thickness 2 mm) made of rubber are placed on both sides of the plate and a 3 mm screw with nut is tightened such that the plate can still be moved around the screw.

This plate 80×25×2 mm with bore hole and screw and sawn edge is placed in a bending apparatus horizontally on both ends and is checked in accordance with ISO 178. Therefore, a die pushes from above on the screw so that a bending of 4 mm is created. This bending from 0 mm to 4 mm back to 0 mm is called a cycle and is repeated with a frequency of 1 Hz until the test piece shows cracks.

The force used for the bending (bending load) depends on the stiffness of the material and decreases as soon as there are cracks in the test piece.

In contrast to the known alternating bend test, the deflection in the case of the bend test with fixation for multiple loads used here only takes place from the zero position in one direction, whereas during the alternating bend test the deflection takes place from the zero position in two opposite directions. The bend test used here is also much more demanding on the material due to the weakening of the material structure of the test piece through the bore hole and the sawn and ground edge.

Surprisingly, it was shown that transparent molds made of polyamide with a higher rigidity than polycarbonate and thus higher bending loads achieved considerably more bending cycles than a polycarbonate with lower bending loads.

The performance of a material during a bend test with fixation cannot be determined from the impact resistance or notch impact strength of the material.

The measurements were performed in accordance with the following standards and on the following test pieces:

Tension elastic modulus: ISO 527 with a tension speed of 1 mm/min ISO tension rod, standard: ISO/CD 3167, type A1, 170×20/10×4 mm, temperature 23° C.

Tensile strength and elongation at break: ISO 527 with a tension speed of 50 mm/min ISO tension rod, standard: ISO/CD 3167, type A1, 170×20/10×4 mm, temperature 23° C.

Impact resistance as per Charpy: ISO 179/*eU ISO tension rod, standard: ISO/CD 3167, type B1, 80×10×4 mm, temperature 23° C.

*1=not arranged for instruments, 2=arranged for instruments

Notch impact strength as per Charpy: ISO 179/*eU ISO tension rod, standard: ISO/CD 3167, type B1, 80×10×4 mm, temperature 23° C.

*1=not arranged for instruments, 2=arranged for instruments

Bending strength with fixation: ISO 178. Test piece see 2.) Measurements Temperature 23° C., Deflection 4 mm The measurement of the bending strength with fixation with multiple loads was performed on a device from the company Dyna-Mess (Achen), CIMTronic 2000 in accordance with ISO 178. The bending load is repeated at a deflection of 4 mm from the zero position (=0 mm) up to 4 mm with a frequency of 1 Hz. The movement of the zero position to the point 4 mm and back to the zero position is a cycle. The number of cycles up to the visible formation of cracks in the test piece is specified, which is also shown through a distinctive change in the tangent increase in the force to be expended.

Glass transition temperature (Tg)

ISO standard 11357-1/-2

Granulate

The Differential Scanning Calorimetry (DSC) was performed with a heating rate of 20° C./min. The temperature for the onset is specified.

Light transmission:

ASTMD 1003

Round plate, thickness 2 mm, radius 37.5 mm

Temperature 23° C.

Measurement device Haze Gard plus from Byk Gardner with CIE light type C. The light transmission value is specified as the % of the quantity of incoming light.

Refractive index and Abbe number:

DIN 53491

Round plate, thickness 2 mm, radius 37.5 mm

Temperature 20° C.

Refractive index $n_D 20$: Measurement with the standard wavelength—the yellow D line of sodium—at 20° C.

Relative viscosity: ISO 307, in 0.5 wt.-% m-cresol solution Temperature 20° C. Calculation of the relative viscosity (RV) as $RV = t/t_0$ in accordance with chapter 11 of the norm.

All test pieces are used in a dry state. Therefore, after die-casting, the test bodies are stored for at least 48 hours at room temperature in a dry environment.

The standard test pieces were produced on an injection-molding machine made by the company Arburg, model Allrounder 320-210-750 Hydronica, wherein cylinder temperatures between 260 and 350° C. and tool temperatures between 60 and 120° C. were used depending on the material to be used and the test piece to be produced. A polished tool is used for the production of the round plates for the measurement of optical properties: light transmission, refractive index and the Abbe number.

3.) Results

Table 1 characterizes the monomers used in the examples.

TABLE 1

| Monomer | Commercial Product | Melting Point [° C.] | Sublimation Temperature [° C.] | Manufacturer |
|---|---|---|---|---|
| MACM | Laromin C260 | −7 to −1 | — | BASF AG |
| PACM | Dicycan | 33.5 to 44 | — | BASF AG |
| IPS | Purified Isophthalic Acid (PIA) | 345 to 348 | 100 at 0.07 mmHg | BP Amoco Chemical |
| TPS | Amoco TA-33 | 427 | 402° C. | BP Amoco Chemical |
| DDS | Dodecandi acid | 130 | — | DuPont |
| Lactam 12 | Laurinlactam | 153 | — | EMS-Chemie AG |

Table 2 specified exemplary compositions according to the invention as well as their excellent properties.

TABLE 2

| Components | Unit | Examples Number | | | | | |
|---|---|---|---|---|---|---|---|
| | | 1 | 2 | 3 | 4 | 5 | 6 |
| MACM | Mol.-%* | — | 100 | 16 | 29 | 39 | 29 |
| HMD | Mol.-%* | 100 | — | 84 | 71 | 52 | — |
| PACM | Mol.-%* | — | — | — | — | 9 | 71 |
| IPS | Mol.-%** | 66.7 | — | 50 | 50 | 50 | — |
| TPS | Mol.-%** | 33.3 | — | 50 | 50 | 50 | — |
| DDS | Mol.-%** | — | 100 | — | — | — | 100 |
| Lactam 12 | Wt.-%*** | — | — | 5 | 4.6 | 3 | — |
| Tests | | 1 | 2 | 3 | 4 | 5 | 6 |
| RV | — | 1.45 | 1.73 | 1.78 | 1.57 | 1.71 | 1.85 |
| Tg | ° C. | 125 | 153 | 152 | 167 | 159 | 145 |
| Tension elastic modulus | MPa | 2900 | 1600 | 2650 | 2700 | 2700 | 1500 |
| Tensile strength | MPa | 85 | 60 | 65 | 75 | 70 | 60 |
| Elongation at break | % | 5 | 150 | 20 | 90 | 20 | 60 |
| Impact resist. Charpy 23° C. | kJ/m2 | oB | oB | oB | oB | oB | oB |
| Notch impact Charpy 23° C. | kJ/m2 | 4 | 9 | 10 | 9 | 10 | 13 |
| Bending test with fixation | Cycles | 62000 | 200000 | 77000 | 110000 | 190000 | 170000 |
| Resulting force from bending test with fixation | N | 90 | 45 | 75 | 90 | 70 | 60 |
| Light transmission | % | 92.5 | 93 | 92 | 93 | 92 | 94 |
| Abbe number | — | 30 | 52 | 27 | 32 | 28 | 52 |
| Refractive index nD20 | — | 1.590 | 1.510 | 1.582 | 1.575 | 1.584 | 1.510 |

*Relating to 100 mol-% diamine
**Relating to 100 mol-% dicarboxylic acid
***Relating to the entire molding material Table 3 contains comparative examples 7 through 12.

TABLE 3

| Components | Unit | Comparative Examples Number | | | | | |
|---|---|---|---|---|---|---|---|
| | | 7 | 8 | 9 | 10 | 11 | 12 |
| Polymethyl methacrylate | Wt.-%*** | 100 a) | — | — | — | — | — |
| Polycarbonate | Wt.-%*** | — | 100 b) | 100 c) | — | — | — |
| MACM | Mol.-%* | — | — | — | 15 | 100 | 100 |
| HMD | Mol.-%* | — | — | — | 85 | — | — |

TABLE 3-continued

| Components | Unit | Comparative Examples Number | | | | | |
|---|---|---|---|---|---|---|---|
| | | 7 | 8 | 9 | 10 | 11 | 12 |
| PACM | Mol.-%* | — | — | — | — | — | — |
| IPS | Mol.-%** | — | — | — | 90 | 100 | 50 |
| TPS | Mol.-%** | — | — | — | 10 | — | 50 |
| Lactam 12 | Wt.-%*** | — | — | — | — | 34 | 24 |
| Tests | | 7 | 8 | 9 | 10 | 11 | 12 |
| RV | — | — | — | — | 1.45 | 1.55 | 1.53 |
| Tg | °C. | 108 | 150 | 145 | 148 | 165 | 192 |
| Tension fatigue module | MPa | 3700 | 2300 | 2400 | 3200 | 2300 | 2200 |
| Tensile strength | MPa | 65 | 55 | — | 85 | 60 | 60 |
| Elongation at break | % | 2.5 | 100 | >50 | 16 | 60 | 50 |
| Impact resist. Charpy 23° C. | kJ/m2 | 17 | oB | oB | 120 | oB | oB |
| Notch impact Charpy 23° C. | kJ/m2 | 2 | 6 | 6 | 5 | 7 | 9 |
| Bending test with fixation | Cycles | 1 | 1500 | 4000 | 20000 | 7000 | 8500 |
| Resulting force from bending test with fixation | N | 50 | 85 | 60 | 85 | 75 | 100 |
| Light transmission | % | 93.5 | 92 | 89 | 92.5 | 93 | 93.5 |
| Abbe number | — | 58 | 30 | 30 | 31 | 40 | 39 |
| Refractive index nD20 | — | 1.490 | 1.585 | 1.585 | 1.585 | 1.537 | 1.543 | a) PMMA 8N
b) Lexan 143 R
c) Makrolon LQ 2647
*Relating to 100 mol-% diamine
**Relating to 100 mol-% dicarboxylic acid
***Relating to the entire molding material
Abbreviations
DDS Dodecandioic acid
IPS Isophtalic acid
Lactam 12 Laurinlactam Bis-(4-amino-3-methyl-cyclohexyl)methane
oB No break
PACM Bis-(4-amino-cyclohexyl)methane
Tg Glass transition temperature
TPS Terephtalic acid
RV Relative viscosity: ISO 307, in 0.5 wt. -% m-cresol solution Temperature 20° C. Calculation of the relative viscosity (RV) as RV = t/$t_o$ In accordance with chapter 11 of the norm.

Abbreviations
DDS Dodecandioic acid
IPS Isophtalic acid
Lactam 12 Laurinlactam
MACM Bis-(4-amino-3-methyl-cyclohexyl)methane
oB No break
PACM Bis-(4-amino-cyclohexyl)methane
Tg Glass transition temperature
TPS terephtalic acid
RV Relative viscosity Polycarbonate tends to quickly form micro fractures, which are preferably created on sawn edge or on the bore hole, so that test pieces made of it only withstand 1500 to 4000 cycles during a bending test with fixation (comparative examples 8 and 9).

However, test pieces made of the transparent polyamide molding material according to the invention withstand according to this test at least 60,000 such cycles without detectible damage and thus without a drop in the bending load (examples 1-6).

In the case of this test, test pieces made of polymethyl methacrylate (PMMA, comparative example 7) already break during the first bending cycle. Polymethyl methacrylate is thus entirely unsuitable for these dynamic loads.

Test pieces made of the polyamide molding material according to the invention in example 2 withstand 200,000 cycles without any damage in the test.

Test pieces made of the polyamide molding material according to the invention in example 4 withstand 110,000 cycles without any damage, although its rigidity is higher than that of the test pieces made of polycarbonate in this test.

The test pieces made of molding material in examples 5 and 6 are particularly resistant to the dynamic load during the bending test with fixation and withstand 190,000 and 170,000 cycles, respectively, which take place without any damage to the test pieces.

The invention claimed is:

1. Transparent mold, made of a polyamide molding material, containing at least one polyamide and/or polyamide blends with a light transmission of at least 75% at a layer thickness of 2 mm, measured in accordance with ASTM D 1003 as well as a resistance in the bending test with fixation of at least 60,000 measurement cycles, measured in accordance with ISO 178 with a special test piece, wherein the at least one polyamide is formed from diamines, which diamines are hexamethylene diamine (HMDA), bis-(4-amino-3-methylcyclohexyl) methane (MACM) and bis-(4-amino-cyclohexyl) methane (PACM) as well as from at least one dicarboxylic acid selected from the group consisting of isophthalic acid (IPS) and terephthalic acid (TPS) or from the aforementioned diamines and dicarboxylic acids in combination with lactams and/or α-/ω-amino acids.

2. Mold according to claim 1, wherein the at least one polyamide and/or polyamide blends is formed relating to 100 mol-% diamine from
   a) Approx. 39 mol-% MACM and
   b) Approx. 52 mol-% HMDA and
   c) Approx. 9 mol-% PACM as well as relating to 100 mol-% of the dicarboxylic acids from
   d) Approx. 50 mol-% IPS and
   e) Approx. 50 mol-% TPS.

3. Mold according to claim 1, wherein up to 10 wt.-% in terms of the total weight of the polyamide molding material is made of lactam and/or an α-/ω- amino acid.

4. Mold according to claim 3, wherein approx. 4.6 wt.-% in terms of the total weight of the polyamide molding material is made of a lactam and/or an α-/ω- amino acid.

5. Mold according to claim 4, wherein approx. 3 wt.-% in terms of the total weight of the polyamide molding material is made of a lactam and/or an α-/ω- amino acid.

6. Mold according to claim 1, wherein the lactam and/or the α-/ω- amino acid is LC 11, LC 12, α-/ω- amino undecane acid and/or α-/ω-amino dodecane acid.

7. Mold according to claim 1, wherein the dicarboxylic acids are replaced by naphthalene dicarboxylic acid for up to a maximum of half of their molar content.

8. Mold according to claim 1, wherein the mold has a light transmission of at least 88% at a layer thickness of 2 mm, measured in accordance with ASTM D 1003.

9. Mold according to claim 1, wherein the resistance in the alternating bend test with fixation is at least 75,000 measurement cycles measured in accordance with ISO 178 with a special test piece.

10. Mold according to claim 1, wherein the mold has a refractive index of 1.490-1.75.

11. Mold according to claim 1, wherein the mold has an Abbe number of at least 25.

12. Mold according to claim 1, wherein the mold is an optical mold.

13. Mold according to claim 12, wherein the optical mold is a lens.

14. Mold according to claim 1, wherein the mold is colored.

15. Mold according to claim 1, wherein the mold has an optically active coating and/or a protective coating.

16. Mold according to claim 1, wherein the at least one polyamide contains additives selected from the group consisting of condensation catalysts, chain regulators, defoaming agents, stabilizers, lubricants, dyes, photochrome additives, antistatics, demolding agents, optical brighteners, natural phyllo silicates, synthetic phyllo silicates or mixtures of the named additives.

* * * * *